(12) United States Patent
Panchbudhe et al.

(10) Patent No.: US 7,831,639 B1
(45) Date of Patent: Nov. 9, 2010

(54) SYSTEM AND METHOD FOR PROVIDING DATA PROTECTION BY USING SPARSE FILES TO REPRESENT IMAGES OF DATA STORED IN BLOCK DEVICES

(75) Inventors: Ankur P. Panchbudhe, Nagpur (IN);
John A. Colgrove, Los Altos, CA (US);
Anand A. Kekre, Pune (IN)

(73) Assignee: Symantec Operating Corporation, Mountain View, CA (US)

(*) Notice: Subject to any disclaimer, the term of this patent is extended or adjusted under 35 U.S.C. 154(b) by 209 days.

(21) Appl. No.: 11/020,862

(22) Filed: Dec. 22, 2004

(51) Int. Cl.
*G06F 17/30* (2006.01)
*G06F 13/00* (2006.01)

(52) U.S. Cl. .................... 707/816; 711/151; 711/170

(58) Field of Classification Search .................. 707/100, 707/203, 204, 816, 999.206; 715/721; 711/151, 711/170
See application file for complete search history.

(56) References Cited

U.S. PATENT DOCUMENTS

| | | | |
|---|---|---|---|
| 5,564,037 A * | 10/1996 | Lam | 711/161 |
| 5,617,566 A * | 4/1997 | Malcolm | 707/204 |
| 5,742,818 A * | 4/1998 | Shoroff et al. | 707/200 |
| 5,953,729 A * | 9/1999 | Cabrera et al. | 707/204 |
| 5,956,745 A * | 9/1999 | Bradford et al. | 711/137 |
| 6,269,382 B1 * | 7/2001 | Cabrera et al. | 707/204 |
| 6,377,958 B1 * | 4/2002 | Orcutt | 707/200 |
| 6,453,383 B1 * | 9/2002 | Stoddard et al. | 711/112 |
| 6,513,051 B1 * | 1/2003 | Bolosky et al. | 707/204 |
| 6,560,615 B1 * | 5/2003 | Zayas et al. | 707/202 |
| 6,604,118 B2 * | 8/2003 | Kleiman et al. | 707/203 |
| 6,748,504 B2 * | 6/2004 | Sawdon et al. | 711/162 |
| 6,804,719 B1 * | 10/2004 | Cabrera et al. | 709/226 |
| 6,823,436 B2 * | 11/2004 | Krishnamurthy | 711/170 |
| 6,829,617 B2 * | 12/2004 | Sawdon et al. | 707/102 |
| 7,107,385 B2 * | 9/2006 | Rajan et al. | 711/4 |
| 7,174,352 B2 * | 2/2007 | Kleiman et al. | 707/203 |
| 7,194,579 B2 * | 3/2007 | Robinson et al. | 711/114 |

(Continued)

FOREIGN PATENT DOCUMENTS

WO    WO 00/07104    *    2/2000

OTHER PUBLICATIONS

Muniswamy-Reddy, Kiran-Kumar, "VERSIONFS: A Versatile and User-Oriented Versioning File System", Technical Report FSL-03-03 (Masters Thesis), Stony Brook University, Dec. 2003, pp. i-ix and 1-40.*

(Continued)

*Primary Examiner*—Robert Stevens
(74) *Attorney, Agent, or Firm*—Campbell Stephenson LLP

(57) ABSTRACT

Various systems and methods are disclosed for storing one or more point-in-time images of data stored in a block device in a sparse file. In one embodiment, a method involves identifying a block of data within a block device and copying the block of data to a sparse file. The block of data is identified in response to being modified. The sparse file stores an incremental image of data stored in the block device. In addition to storing an incremental image, sparse files can be used to store full images. Furthermore, a sparse file can store multiple images (full and/or incremental) of data stored in a block device.

23 Claims, 5 Drawing Sheets

U.S. PATENT DOCUMENTS

| | | | | |
|---|---|---|---|---|
| 7,194,595 B1* | 3/2007 | Fair et al. | ..................... | 711/202 |
| 7,243,207 B1* | 7/2007 | Prakash et al. | .............. | 711/202 |
| 7,284,150 B2* | 10/2007 | Ma et al. | ........................ | 714/6 |
| 7,321,962 B1* | 1/2008 | Fair et al. | ..................... | 711/202 |
| 7,334,094 B2* | 2/2008 | Fair | ........................... | 711/161 |
| 7,356,679 B1* | 4/2008 | Le et al. | ......................... | 713/1 |
| 7,389,394 B1* | 6/2008 | Karr et al. | ..................... | 711/162 |
| 7,395,278 B2* | 7/2008 | Zwilling et al. | ............. | 707/200 |
| 7,409,511 B2* | 8/2008 | Edwards et al. | ............. | 711/161 |
| 7,457,982 B2* | 11/2008 | Rajan | ........................... | 714/15 |
| 7,577,692 B1* | 8/2009 | Corbett et al. | ...................... | 1/1 |
| 7,636,744 B1* | 12/2009 | Aggarwal et al. | ................... | 1/1 |
| 7,698,401 B2* | 4/2010 | Atluri et al. | ................. | 709/223 |
| 7,747,660 B1* | 6/2010 | Rajan et al. | .................. | 707/821 |
| 2001/0044807 A1* | 11/2001 | Kleiman et al. | ............. | 707/203 |
| 2002/0049718 A1* | 4/2002 | Kleiman et al. | ................ | 707/1 |
| 2003/0158862 A1* | 8/2003 | Eshel et al. | ................. | 707/200 |
| 2003/0158863 A1* | 8/2003 | Haskin et al. | ............... | 707/200 |
| 2003/0158873 A1* | 8/2003 | Sawdon et al. | .............. | 707/204 |
| 2003/0159007 A1 | 8/2003 | Sawdon et al. | .............. | 711/154 |
| 2004/0030822 A1* | 2/2004 | Rajan et al. | ..................... | 711/4 |
| 2004/0078641 A1* | 4/2004 | Fleischmann | ................... | 714/6 |
| 2004/0267828 A1* | 12/2004 | Zwilling et al. | ............. | 707/200 |
| 2004/0267835 A1* | 12/2004 | Zwilling et al. | ............. | 707/202 |
| 2004/0268068 A1 | 12/2004 | Curran et al. | ............... | 711/162 |
| 2005/0050110 A1* | 3/2005 | Sawdon et al. | .............. | 707/201 |
| 2005/0065986 A1* | 3/2005 | Bixby et al. | ................. | 707/204 |
| 2005/0097126 A1* | 5/2005 | Cabrera et al. | .............. | 707/102 |
| 2005/0223043 A1* | 10/2005 | Randal et al. | ............... | 707/200 |
| 2005/0240725 A1* | 10/2005 | Robinson et al. | ............ | 711/114 |
| 2005/0246397 A1* | 11/2005 | Edwards et al. | ............. | 707/204 |
| 2005/0246401 A1* | 11/2005 | Edwards et al. | ............. | 707/205 |
| 2005/0246503 A1* | 11/2005 | Fair | ........................... | 711/147 |
| 2005/0257083 A1* | 11/2005 | Cousins | ......................... | 714/6 |
| 2005/0273858 A1* | 12/2005 | Zadok et al. | .................. | 726/24 |
| 2006/0075294 A1* | 4/2006 | Ma et al. | ....................... | 714/13 |
| 2006/0179261 A1* | 8/2006 | Rajan | ........................... | 711/162 |

OTHER PUBLICATIONS

Bolosky, William J., et al., "Single Instance Storage in Windows 2000", Proceedings of the 4th USENIX Windows Systems Symposium, Seattle, WA, Aug. 3-4, 2000, pp. 1-12 (downloaded from: www.usenix.org/events/usenix-win2000/full_papers/bolosky/bolosky_html/).*

Microsoft Computer Dictionary, 5th Edition, Microsoft Press, Redmond, WA, © 2002, p. 558.*

"Definition for: sparse file", downloaded from: www.computeruser.com/resources/dictionary/definition.html?lookup=4756, Mar. 18, 2007, one page.*

Azagury, Alain, et al., "Point-in-Time Copy: Yesterday, Today and Tomorrow", 10th Goddard Conf. on Mass Storage Systems and Technologies in cooperation with the 19th IEEE Symposium on Mass Storage Systems, College Park, MD, Apr. 15-18, 2002, pp. 259-270.*

Wang, Fusheng, et al., "Temporal Queries in XML Document Archives and Web Warehouses", TIME-ICTL '03, Jul. 8-10, 2003, pp. 47-55.*

Jermaine, Christopher, et al., "Online Maintenance of Very Large Random Samples", SIGMOD 2004, Paris, France, Jun. 13-18, 2004, pp. 299-310.*

Cabrera, Luis Felipe, et al., "Advances in Windows NT Storage Management", IEEE Computer, Oct. 1998, pp. 48-54.*

Elnozahy, E. N., et al., "The Performance of Consistent Checkpointing", 11th Symposium of Reliable Distributed Systems, Dallas, TX, Oct. 5-7, 1992, pp. 39-47.*

Kochut, A., et al., "Management Issues in Storage Area Networks: Detection and Isolation of Performance Problems", Network Operations and Management Symposium, Apr. 19-23, 2004, pp. 453-466.*

Kim, Kangho, et al., "GNBD/VIA: A Network Block Device Over Virtual Interface Architecture on Linux", IPDPS '02, Ft. Lauderdale, FL, Apr. 15-19, 2002, pp. 7-13.*

Microsoft Computer Dictionary, 5th Edition, Microsoft Press, Redmond, WA, © 2002, pp. 202 and 365.*

Thain, Douglas, et al., "The case for Sparse Files", Technical Report 1464, Univ. of Wisconsin Computer Sciences Dept., Jan. 10, 2003, pp. 1-15.*

Carrier, Brian D., et al., "A Hardware-Based Memory Acquisition Procedure for Digital Investigations", Digital Investigation, vol. 1, Issue 1, Feb. 2004, pp. 50-60.*

Richter, Jeffrey, et al., "A File System for the 21st Century: Previewing the Windows NT 5.0 File System", Microsoft Systems Journal, www.microsoft.com/msj/1198/ntfs/ntfs.aspx, Nov. 1998, pp. 1-17.*

Muniswamy-Reddy et al., Stony Brook University, "A Versatile and User-Oriented Versioning File System", http://www.fsl.cs.sunysb.edu/docs/versionfs-fast04/, Published Feb. 8, 2004, 22 pages (printed on Feb. 10, 2005).

* cited by examiner

Volume at T1:

"Holes" (invalid data)

Sparse File containing Image of Volume at T1:

Volume at T2:

"Holes"

Sparse File containing Incremental Image of Volume at T2:

Volume at T2:

"Holes"

Sparse File containing Full Image at T1 and Incremental Image of Volume at T2:

SYSTEM AND METHOD FOR PROVIDING DATA PROTECTION BY USING SPARSE FILES TO REPRESENT IMAGES OF DATA STORED IN BLOCK DEVICES

FIELD OF THE INVENTION

This invention relates to data processing systems and, more particularly, to the backup and/or replication of data in a data processing system.

BACKGROUND

Point-in-time copies of application data are often maintained in order to provide fault tolerance within a system. For example, businesses typically create backup copies of user data on a regular basis. If user data is later lost (e.g., due to a user accidentally deleting a file or due to the failure of a storage device), the lost data can be restored from the backup copy. In order to provide consistency, copies of application data are created in such a way that the copies represent the value of the application data at a particular point in time.

It is desirable to create new point-in-time copies of application data at rather frequent intervals. If, for example, backups are only performed every night at midnight, a file that was created at 1 PM and accidentally deleted at 3 PM of the same day will not be present on any backup. If an additional point-in-time copy of the application data is created daily at 2 PM, however, a version of the lost file could be recovered from the copy created at 2 PM. Techniques such as those used to generate snapshots are often used to create point-in-time copies of application data at frequent intervals. These techniques tend to be less disruptive to users than conventional backup techniques.

One drawback to creating copies of application data more frequently is that there is likely to be a large number of point-in-time copies of the application in existence at the same time. Each point-in-time copy is likely to require a large amount of storage space, and thus the cost of maintaining these point-in-time copies may quickly become prohibitive.

Additionally, point-in-time copies are typically maintained as logical block devices (e.g., each snapshot of a block device can be maintained as a separate volume). Management of these devices can be complex. Thus, the utilities required to create and maintain point-in-time copies can involve a significant amount of overhead that is devoted to creating and maintaining the block devices that store the point-in-time copies. This can increase the price and/or reliability of the utilities that create and maintain point-in-time copies.

As the above examples show, existing techniques for creating and maintaining point-in-time copies of data stored in block devices may consume undesirably large amounts of storage and/or be undesirably complex. Accordingly, new techniques that reduce the amount of storage needed to store point-in-time images and/or that decrease the complexity involved in managing such point-in-time images are desired.

SUMMARY

Various embodiments of systems and methods are disclosed for storing one or more point-in-time images of data stored in a block device in a sparse file. In one embodiment, a method involves identifying a block of data within a block device and copying the block of data to a sparse file. The block of data is identified in response to being modified. The sparse file stores an incremental image of data stored in the block device. The block of data can be copied by advancing to a new location in the sparse file, without writing to one or more intervening locations, and then writing the value of the block of data at the new location in the sparse file. In addition to storing an incremental image, sparse files can be used to store full images. Furthermore, a sparse file can store multiple images (full and/or incremental) of data stored in a block device.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
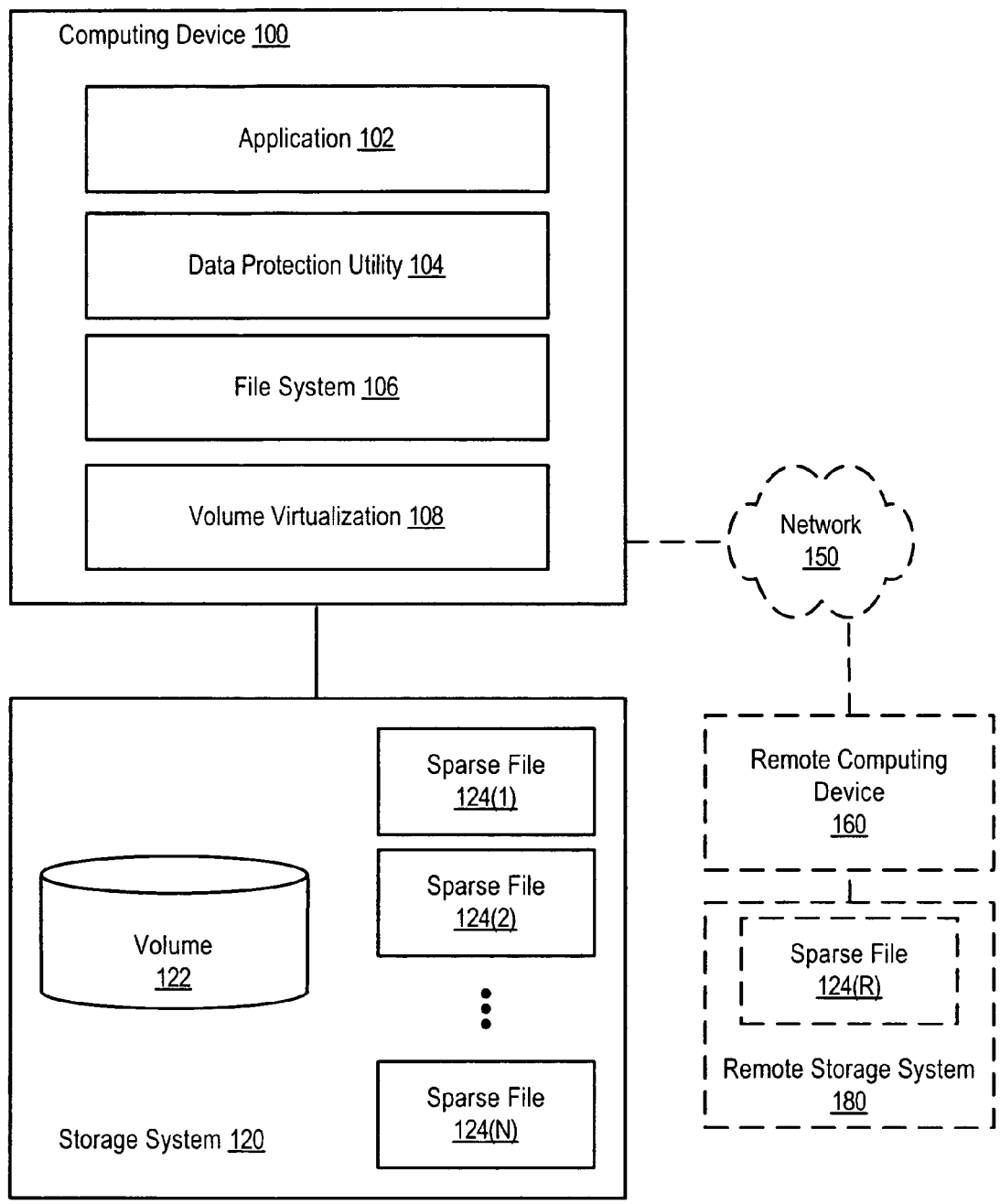
FIG. 1 shows a system that uses sparse files to store point-in-time images of data stored in a block device, according to an embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A data protection utility can store point-in-time images of data stored in block devices in sparse files, as opposed to storing the point-in-time images as independent block devices. For example, a backup utility can create snapshots (both full and incremental) of a data volume in one or more sparse files. Similarly, a replication utility can create a replica of a data volume in a sparse file, and then transfer the sparse file to the remote location at which the replica is desired.

By using sparse files, several advantages can be obtained. If the block device contains a large amount of invalid data, the invalid data is not copied to the sparse file and space is not allocated within the sparse file to store the invalid data. Accordingly, the sparse file may take up significantly less storage space than the block device and less time may be needed to copy the data from the block device to the sparse file than if all of the data (valid and invalid) within the block device were copied.

FIG. 1 shows a system that uses sparse files to store point-in-time images of data stored in a block device. In FIG. 1, a computing device 100 implements an application 102, a data protection utility 104, a file system 106, and a volume virtualization module 108. Computing device 100 is coupled to a storage system 120, which includes a volume 122 as well as N sparse files 124(1)-124(N). In this example, each sparse file 124(1)-124(N) stores a point-in-time image of volume 122. Computing device 100 can be coupled to storage system 120 directly and/or by one or more SANs (Storage Area Networks) or the like.

Optionally (as indicated by the dashed lines), computing device 100 can also be coupled by a network 150 to a remote computing device 160. A remote computing device 160 accesses a remote storage system 180, which includes another sparse file (a sparse file 124(R)) that also stores a point-in-time image of volume 122. Network 150 can include a WAN (Wide Area Network), such as the Internet and/or one or more LANs (Local Area Networks) implemented from various networking media (e.g., wireless links, fiber optic links, cables, and the like).

Computing device 100 is configured to execute software implementing various applications (e.g., application 102, data protection utility 104, file system 106, volume virtualization module 108, and the like). Computing device 100 can include a workstation, personal computer, server, PDA (Personal Digital Assistant), cell phone, storage network switch, storage device, storage array controller, or any other device configured to execute software implementing such applications. Alternatively, computing device 100 can be implemented from one or more logic devices (e.g., PLDs, FPGAs, and the like) configured to perform the functions of such applications. Computing device 100 can also be implemented using logic devices that are configured to perform some of the functions of the applications and that are also configured to execute software implementing other functions of the applications.

Application 102 is an example of an application that accesses application data in volume 122. Application 102 can be implemented in software that executes on computing device 100. Application 102 can be any one of a variety of applications, such as a database application, a word processing application, and the like.

Data protection utility 104 is an application that provides protection (e.g., in the form of increased redundancy) for data in volume 122. Data protection utility 104 provides this protection by generating and maintaining point-in-time copies of volume 122. These point-in-time copies can be stored as backup copies, snapshots, replicas, or any other structure that maintains information indicative of the value of volume 122 at a particular point in time. Data protection utility 104 can be a backup utility and/or a replication utility. In some embodiments, all or part of the functionality of data protection utility 104 is integrated with file system 106 and/or volume virtualization module 108.

File system 106 organizes and provides access to files within volume 122. File system 106 maintains information that indicates how each file maps to the underlying volume. For example, a file can be subdivided into three extents. These extents can be stored in non-contiguous locations, with respect to each other, on the underlying volume. File system 130 tracks the starting location (e.g., as identified using a logical block address (LBA)) of each extent within the file, as well as the length of each extent, if variable-sized extents are supported. It is noted that file extents may differ in size from volume extents. For example, one file extent can include several volume extents or vice versa.

Volume virtualization module 108 creates and manages one or more logical storage devices, called volumes, such as volume 122. Volume virtualization module 108 can be either in-band (e.g., the virtualization component can implemented in the data path of data being written to the volumes) or out-of-band (e.g., the virtualization component can sit outside the data path). Applications such as databases and file systems view and access the logical volumes managed by the virtualization component in the same way that the applications would view and access physical storage devices.

Volume 122 can be implemented on one or more physical storage devices. A physical storage device can be a single device (e.g., a single hard drive, CD (Compact Disc) drive, or DVD (Digital Versatile Disc) drive). Alternatively, a storage device may include an array of such devices (e.g., a RAID array of several hard drives controlled by a hardware array controller). Also, portions of more than one data volume can be implemented on the same physical storage device.

In this embodiment, volume virtualization module 108 is implemented in software that executes on computing device 100. In alternative embodiments, volume virtualization module 108 is implemented in hardware and/or software on a network switch, network appliance, or storage device controller (e.g., an array controller).

As noted above, data protection utility 104 generates point-in-time copies of volume 122 and stores these images in sparse files. In some embodiments, data protection utility 104 stores each point-in-time copy locally (e.g., at the same location, in one of sparse files 124(1)-124(N)). In other embodiments, data protection utility 104 stores one or more point-in-time copies at a remote location, such as in sparse file 124(R) at remote storage system 180.

In addition to storing point-in-time images in sparse files in local storage system 120, data protection utility 104 can also transfer copies of the sparse files (e.g., to a remote system) and perform other administrative functions on the sparse files. For example, in order to reduce the amount of space taken up by images of volume 122, data protection utility 104 (or another user) can use a file compression utility to compress one or more of sparse files 124(1)-124(N). Similarly, data protection utility 104 (or another user) can encrypt one or more of sparse files 124(1)-124(N). Data protection utility 104 can also export a sparse file as a block device (e.g., using LINUX operating system functionality such as the FILEIO/BLKDEV device handler facility). Additionally, other users can access the sparse files 124(1)-124(N) created by data protection utility 104 via file system 106. Various file system operations can be performed on the point-in-time image by specifying the sparse file as the target of various file system commands, such as cp (copy) and rcp or scp (remote copy). Access to the point-in-time image can be shared by using a file-sharing protocol (e.g., such as NFS (Network File System), CIFS (Common Internet File System), and the like) to provide shared access to the sparse file. Cataloging, versioning and archiving of the point-in-time images of volume 122 can also be provided using tools like Concurrent Versioning System (an open source version control system) and Visual SourceSafe™ (available from MICROSOFT Corporation of Redmond, Wash.) to control access to sparse files 124(1)-124 (N) created by data protection utility 104. As all of these examples show, management of point-in-time images that are stored in sparse files can be performed using various file management tools.

The example of FIG. 1 shows application 102, data protection utility 104, file system 106, and volume virtualization module 108 as independent modules. It is noted that in alternative embodiments, the functionality of these modules can be combined and/or implemented in other ways. For example, data protection utility 104 and volume virtualization module 108 can be combined into a single module.

Additionally, the functionality of application 102, data protection utility 104, file system 106, and volume virtualization module 108 can be implemented in different devices (as opposed to being implemented within a single computing device as shown in FIG. 1). For example, application 102 can be implemented on a server, while data protection utility 104 is implemented on a network appliance interposed between the server and the storage device(s) implementing volume 122.

Figure 2:
FIG. 2 shows an example of a block device and a sparse file that stores a full point-in-time image of the data stored in the block device, according to one embodiment of the present invention.
Figure 2:
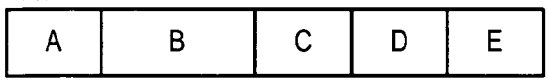
Figure 2:
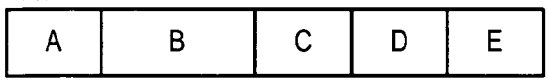

FIG. 2 shows an example of a block device and a sparse file that stores a full point-in-time image of the data stored by the block device. As shown, at time T1, the volume includes several valid units of data: A, B, C, D, and E. The volume also includes a large amount of invalid data (e.g., in extents that have not yet been initialized by an application reading from and/or writing to those extents). These extents are shown as "holes" in the volume.

When a data protection utility (e.g., data protection utility 104 of FIG. 1) creates a point-in-time image of the volume, the data protection utility can create the point-in-time image in a sparse file. A sparse file does not have space allocated for holes. However, when accessed by an application, the sparse file will appear to contain the same amount of data as a corresponding file in which space has been allocated to the holes. For example, if at T1 the volume contains only 5 MB of valid data, the sparse file storing the image of the volume at T1 will only take up 5 MB of space. However, if an application uses normal file system commands to view the size of the sparse file, the sparse file will appear to have the same size as the volume (it is noted that certain commands, such as the 'du' command in UNIX, will reveal all of the allocated blocks of a sparse file, allowing the actual size of the sparse file to be determined). Thus, as shown in FIG. 2, an image of the volume can be stored in a sparse file that takes up significantly less space than the volume itself.

In UNIX, a sparse file is created by advancing to a location within a file without also writing to all of the intervening locations in the file. In response to such a command, the file system will not allocate space to the locations that are not written to. For example, an application can create a new file, write 1 Kb of data, advance 10 Kb, and then write 1 Kb of data. The file system will create a sparse file by only allocating 2 Kb of space (1 Kb at the beginning of the file and 1 Kb at the end of the file), which respectively store the 1 Kb values written by the application. However, the sparse file will appear to be 12 Kb in size. If an application reads from one of the unallocated regions of the sparse file, the file system will return a default value (e.g., all zeros). If an application writes to one of the unallocated regions of the sparse file, the file system will allocate space to store the new value of that region.

A file system creates a sparse file by not assigning a value to one or more pointers within an inode that corresponds to the sparse file. An inode (a metadata structure used by the file system to map regions of a file to regions of a block device) can include several pointers and/or indirect pointers. The pointers are each used to identify the starting location of a corresponding region of the file. For example, the first 10 pointers within an inode can respectively identify the locations of the first 10 blocks or extents of the file to which the inode corresponds. The indirect pointers within an inode are simply pointers to blocks of pointers (or blocks of other indirect pointers), which in turn identify the starting location of a corresponding region of the file (indirect pointers are used in situations in which it is desirable to keep inode size relatively small while also allowing relatively large file sizes). If the application seeks to a location in the file without writing any data to the intervening region(s) of the file, the pointer(s) to those regions will not be assigned any value. In contrast, pointers to regions of the file that are written to by the application will have values.

Files that are referred to as sparse files in the context of UNIX file systems differ from files that are referred to as sparse files in the context of NTFS (New Technology File System). In the context of NTFS, sparse files are automatically created by the file system (as opposed to being created by an application in UNIX file systems), such that space is not allocated to large strings of data that are composed entirely of zeros (referred to as non-meaningful data).

It is noted that in conventional systems, point-in-time images are stored in independent block devices (e.g., volumes). Management of such block devices is (from the perspective of the application that generates the point in time images) typically more complicated than management of a file (including sparse files), since file management is handled by the file system. For example, when a file changes size, the application causing the change in file size does not typically have to allocate space to or deallocate space from the file. Instead, the file system automatically handles the allocation and/or deallocation needed to effect the change in file size. In contrast, when an application needs to grow or shrink a block device in order to update a point-in-time image, the application may need to handle the allocation and/or deallocation of space to the block device. Thus, applications that store point-in-time images in block devices may be more complicated (and accordingly more expensive and time-consuming to develop) than applications that store point-in-time images in sparse files.

Figure 3:
FIG. 3 shows an example of a sparse file that stores an incremental point-in-time image of the data stored in the block device, according to one embodiment of the present invention.
Figure 3:
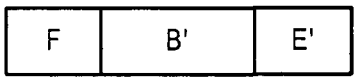
Figure 3:
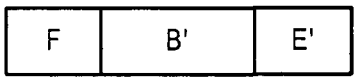

Incremental point-in-time images of data stored in a block device can also be stored in a sparse file. FIG. 3 shows an example of a sparse file that stores an incremental image of the volume shown in FIG. 2. In FIG. 3, the state of the volume at time T2 is illustrated. As shown, the volume now stores the values A, F, B', C, D, and E' (values B and E were changed to values B' and E' respectively, and value F is the new value of a previously-invalid region of the volume). Instead of creating a new full image of the volume at time T2, the data protection utility can simply store the values of the regions of the volume that have changed since the last point-in-time image was created (at T1 in this example). Thus, the data protection utility creates a new sparse file that stores values F, B', and E'. It is noted that this sparse file does not have any space allocated to regions of the volume that are valid but have not been modified subsequent to T1 (e.g., such as regions A, C, and D).

Figure 4:
FIG. 4 shows an example of a sparse file that stores both a full point-in-time image and an incremental point-in-time image of the data stored in the block device, according to one embodiment of the present invention.
Figure 4:
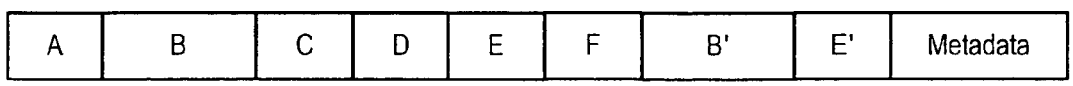

In some embodiments, multiple point-in-time images of data stored by a block device are stored in a single sparse file. FIG. 4 shows an example of a sparse file that stores both a full point-in-time image and an incremental point-in-time image of the data stored in the block device. In this example, the two point-in-time images shown in FIGS. 3 and 4 are stored in a single sparse file. Thus, the same sparse file stores images of the volume at both T1 and T2.

The sparse file also includes metadata, which identifies which portions of the sparse file correspond to each image of the volume. In this example, the metadata can identify that values A, B, C, D, and E (e.g., by identifying the locations of those values within the sparse file) correspond to the image of the volume at T1. The metadata can also identify that values F, B', and E' correspond to the image of the volume at T2.

Figure 5:
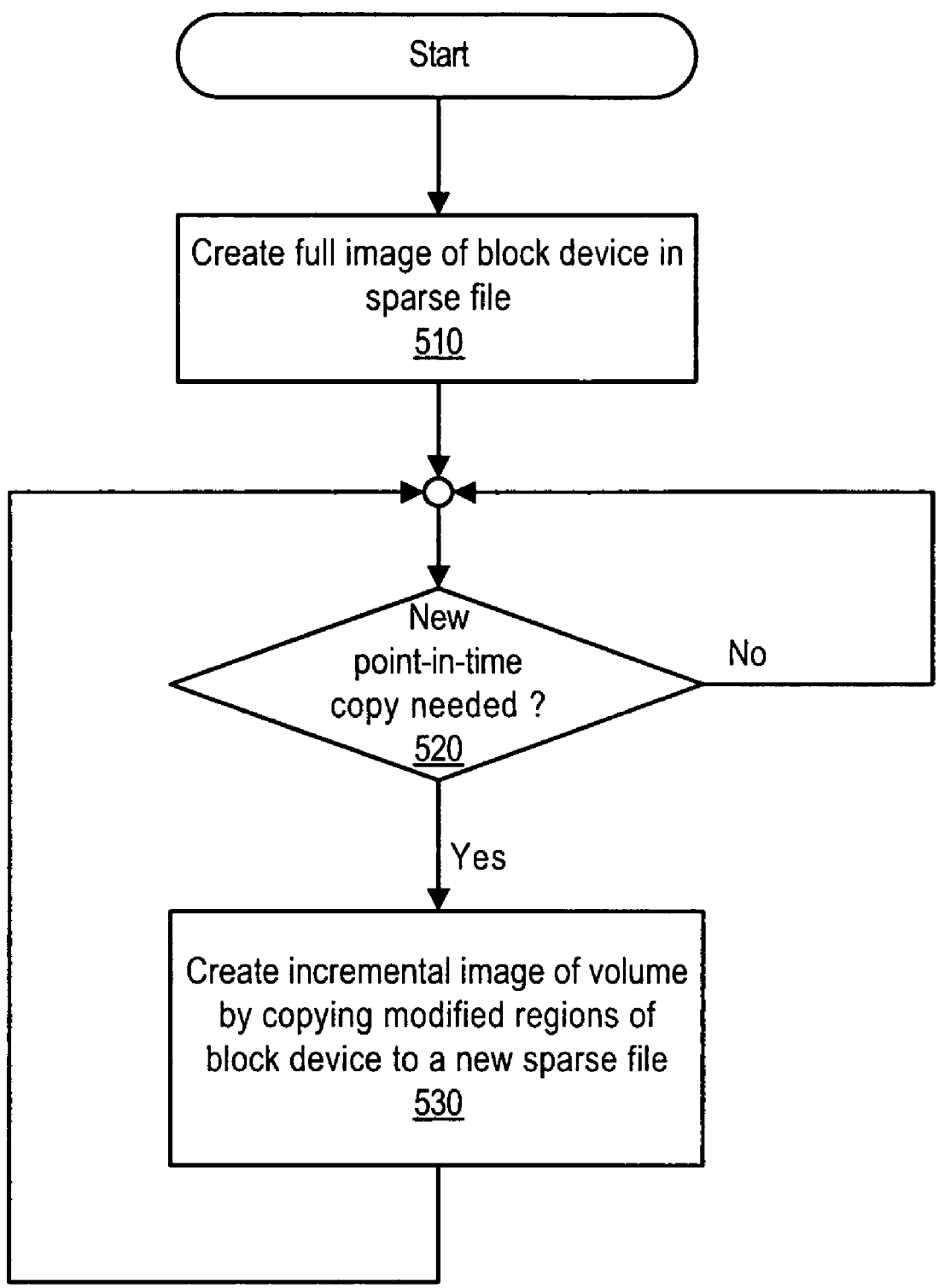
FIG. 5 is a flowchart illustrating one embodiment of a method of using sparse files to store images of the data stored in a block device.

FIG. 5 is a flowchart illustrating one embodiment of a method of using sparse files to store images of data in a block device. At 510, a full image of data in a block device is created in a sparse file. The block device is any randomly-accessible block-based device (e.g., a hard disk, volume, CD (Compact Disc), or the like). As noted above, the block device can include "holes," or regions of invalid data. When the sparse file is created at 510, space is not allocated for these holes. In other words, space within the sparse file is only allocated to store valid data copied from the block device.

It is noted that data can be copied to the sparse file either all at once or over some period of time. For example, in one embodiment, a user's access to the block device is temporarily halted in order to allow the valid regions of the block device to be copied to the sparse file. The valid regions can then be copied at substantially the same time. In other embodiments, user access to the block device is not disrupted by creation of the image in the sparse file. For example, each time a user write to a region of the block device is detected, copy-on-write techniques can be used to copy the value of that region of the block device to the sparse file before the region is modified by the write. In such an embodiment, the valid regions of the block device may be copied to the sparse file at substantially different times.

The sparse file created at 510 can be used as a snapshot, backup, or replica of the block device. For example, the sparse file can be created locally and then copied to a remote location for use as a replica of the block device. The sparse file can be copied in a manner that preserves the "sparseness" of the file (i.e., during the copying process, the value of the unallocated regions of the file will not be copied). Similarly, a sparse file can be created on a local hard drive and then copied to a tape device for use as a backup.

In response to certain conditions, detected at 520, a new point-in-time copy of the data in the block device is needed. For example, new point-in-time copies can be created periodically, and thus at the expiration of each period, it is necessary to create a new point-in-time copy. Alternatively, the need for a new point-in-time copy can be detected in response to other conditions, such as user input or the amount of modified data in the block device (since the creation of the last point-in-time image) exceeding a threshold amount. Various other conditions can also be used to trigger the creation of a new point-in-time copy.

If a new point-in-time copy is needed, as detected at 520, an incremental image of the data in the block device is created in a new sparse file, as indicated at 530. This image of the data in the block device is created in a similar manner to the full image of the block device. However, instead of copying all valid regions of the block device to the sparse file, only the values of the valid regions that have been modified subsequent to the creation of the last point-in-time image of the data in the block device are copied to the sparse file.

After the incremental image is created, subsequent incremental images can be created each time the need for a new point-in-time copy of the data in the block device is detected at 520. It is noted that additional full images of the data in the block device can also subsequently be created (not shown) instead of and/or in addition to the incremental images.

Figure 6:
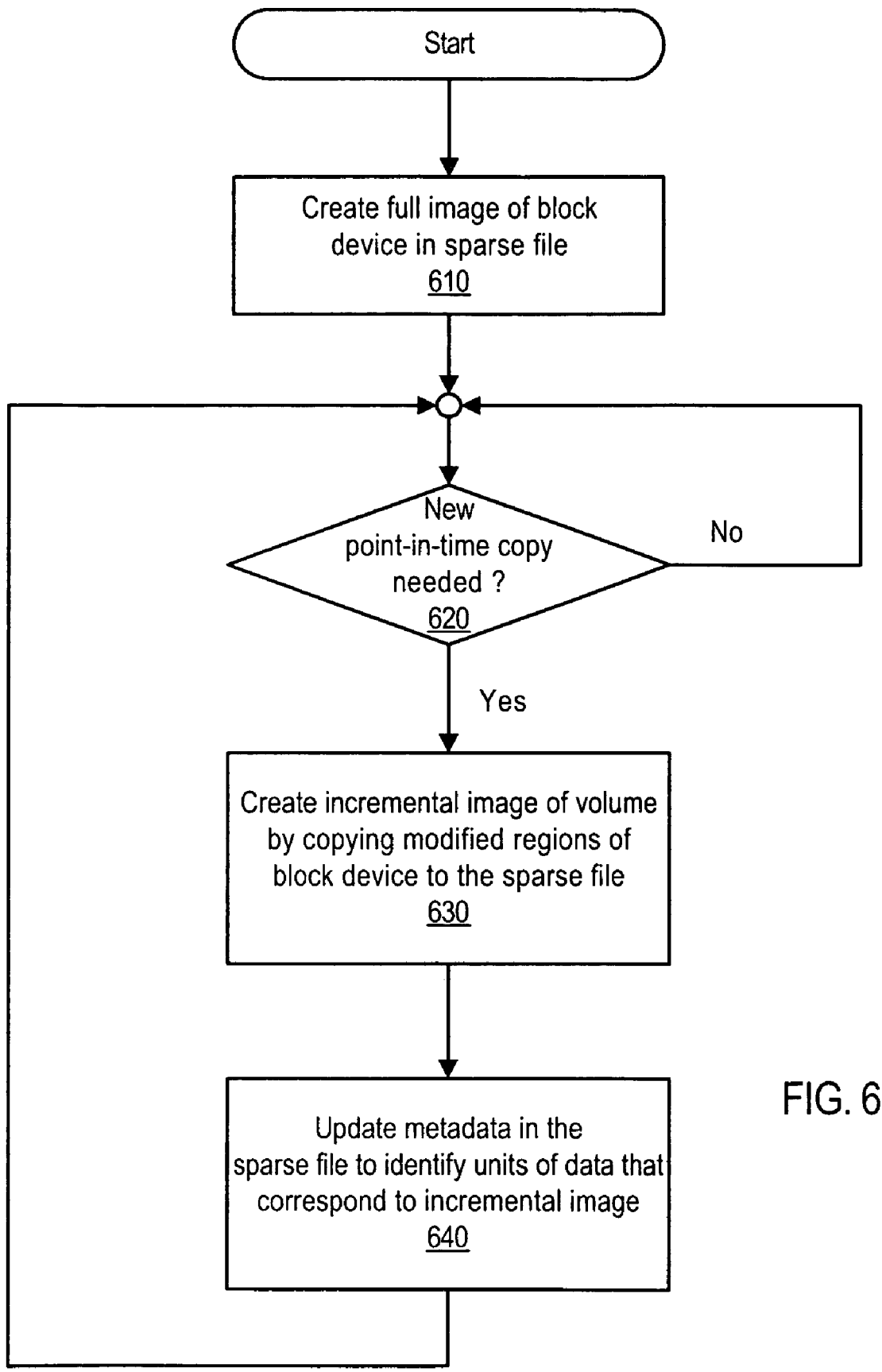
FIG. 6 is a flowchart of one embodiment of a method of using a single sparse file to store multiple images of data stored in a block device.

FIG. 6 is a flowchart of one embodiment of a method of using a single sparse file to store multiple images of the data in a block device. At 610, a full image of data in a block device is created in a sparse file, as described above.

At 620, the need to create a new point-in-time image of the data stored in the block device can be detected (e.g., based on triggering conditions such as those discussed above with respect to function 520 of FIG. 5). In response to detecting the need to create a new image of the data in the block device (e.g., by detecting that the beginning of a new period if images are created periodically), an incremental image of the data in the block device is stored in the sparse file, as shown at 630. It is noted that this sparse file is the same sparse file that stores the full image of the block device (stored at 610). In one embodiment, the data included in the incremental image is stored at the end of the sparse file, after the data included in the full image.

In addition to storing the data that makes up the incremental image in the sparse file, metadata within (or associated with) the sparse file can be updated, as shown at 640. The metadata identifies which portions of the sparse file correspond to each image of the data in the block device. For example, a portion of the metadata can identify the regions of the sparse file that store a full image, created at time T1, of the data in the block device. Another portion of the metadata can identify the regions of the sparse file that store an incremental image, created at time T2, of the data in the block device.

It is noted that alternative embodiments can differentiate different images in the same sparse files in other ways (e.g., without using the metadata described above with respect to function 640). For example, each unit of data copied to the sparse file can include a timestamp, and units of data belonging to the same image include the same timestamp. Thus, in such an embodiment, the data in each image can be identified based on timestamps associated with each unit of data. Other embodiments can differentiate between images in other ways.

Similarly to the method of FIG. 5, the method of FIG. 6 can repeatedly create new incremental images of the data in the block device in response to detecting the need for a new point-in-time copy of the data in the block device. While the method of FIG. 6 illustrates that each subsequent image is an incremental image, it is noted that full images can be created instead of and/or in addition to all or some of the incremental images.

Figure 7:
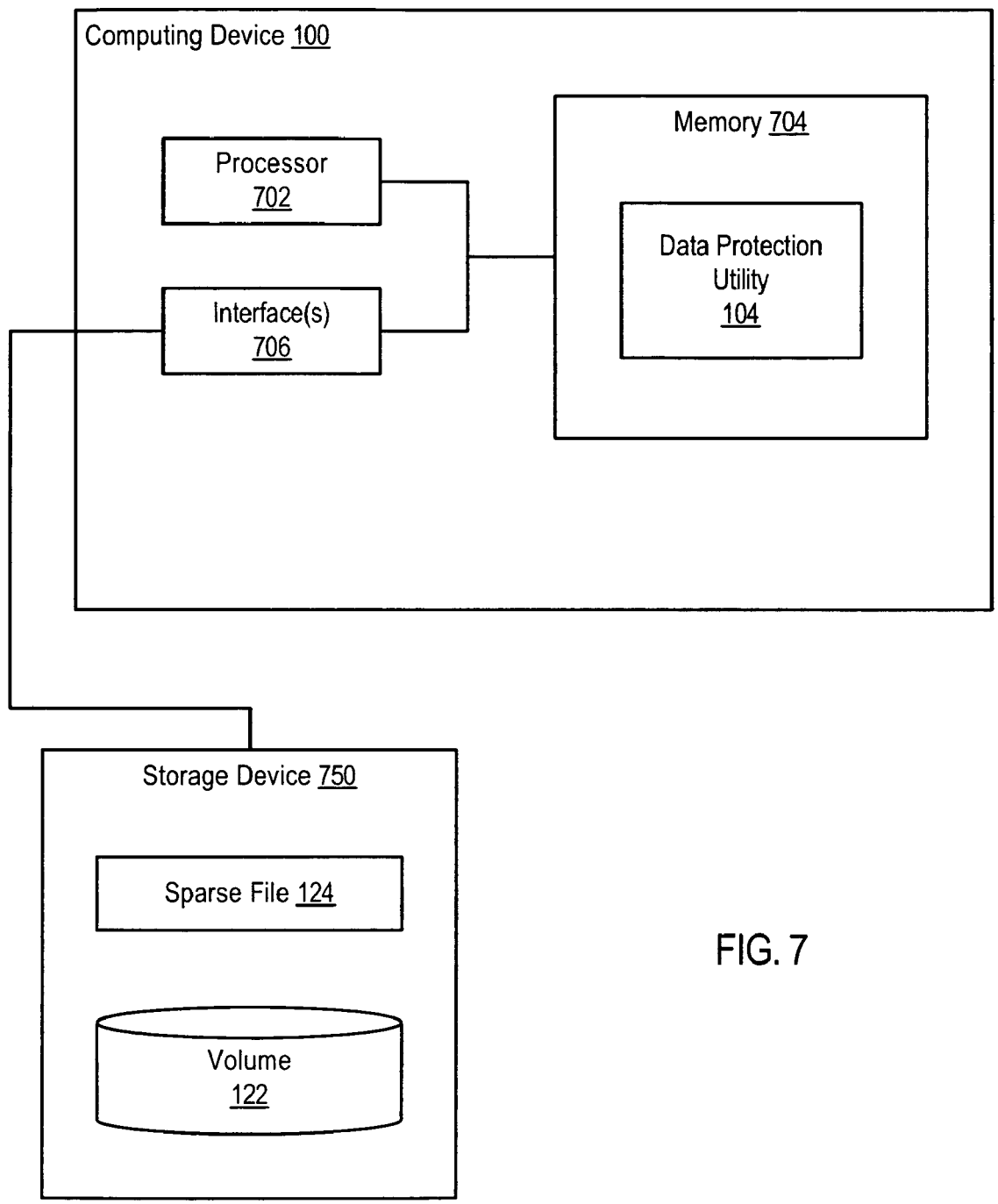
FIG. 7 illustrates a computing device that uses sparse files to store point-in-time images of data stored in a block device, according to one embodiment of the present invention.

FIG. 7 illustrates a computing device that uses sparse files to store point-in-time images of the data stored in a block device. FIG. 7 illustrates how data protection utility 104 can be implemented in software. As illustrated, computing device 100 includes one or more processors 702 (e.g., microprocessors, PLDs (Programmable Logic Devices), or ASICs (Application Specific Integrated Circuits)) configured to execute program instructions stored in memory 704. Memory 704 can include various types of RAM (Random Access Memory), ROM (Read Only Memory), Flash memory, MEMS (Micro Electro-Mechanical Systems) memory, and the like. Computing device 100 also includes one or more interfaces 706. Processor 702, interface 704, and memory 706 are coupled to send and receive data and control signals by a bus or other interconnect.

Interface(s) 706 can include an interface to the storage device(s) 750 on which one or more volumes 122 are implemented, as shown in FIG. 7. Such storage devices 750 can also store one or more sparse files 124 created by data protection utility 104 (all or part of each sparse file can also be stored, at least temporarily, in memory 704). Interface(s) 706 can also include an interface to network for use in communicating with a system at another site when performing replication of data to or from that site.

The program instructions and data implementing data protection utility 104 can be stored on various computer readable storage media such as memory 704. In some embodiments, data protection utility software is stored on a computer readable storage medium such as a CD (Compact Disc), DVD (Digital Versatile Disc), hard disk, optical disk, tape device, floppy disk, and the like. In order to be executed by processor 702, the instructions and data implementing data protection utility 104 are loaded into memory 704 from the other computer readable storage medium. The instructions and/or data implementing data protection utility can also be transferred to computing device 100 for storage in memory 704 via a network such as the Internet or upon a carrier medium. In some embodiments, a computer readable medium is a carrier medium such as a network and/or a wireless link upon which signals such as electrical, electromagnetic, or digital signals, on which the data and instructions implementing data protection utility 104 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method comprising:
   creating a first point-in-time image of a volume in a sparse file, wherein
     the first point-in-time image is represented in a sparse format, and
     the creating the first point-in-time image comprises:
       identifying a first block of data within the volume, wherein
         the first block of data is identified in response to being modified subsequent to a particular point in time, and
       storing a copy of the first block of data to the sparse file, in response to the identifying the first block of data;
   creating a second point-in-time image of the volume in the sparse file, wherein
     the second point-in-time image is represented in the sparse format, and
     the creating the second point-in-time image comprises:
       identifying a second block of data within the volume, wherein
         the second block of data is identified in response to being modified subsequent to the particular point in time, and
       storing a copy of the second block of data to the sparse file, in response to the identifying the second block of data;
   and
   performing an administrative action on the first and second point-in-time images stored within the sparse file, wherein
     the performing comprises specifying the sparse file as a target of a file-specific command,
     the file-specific command is one of a plurality of file system commands, and
     the performing is performed by a computing device implementing a data protection utility.

2. The method of claim 1, wherein the storing the copy of the first block of data further comprises:
   advancing to a new location in the sparse file without writing to one or more intervening locations; and
   writing a value of the first block of data at the new location in the sparse file.

3. The method of claim 1, further comprising:
   storing a third point-in-time image of the volume in a second sparse file.

4. The method of claim 3, further comprising:
   storing a full image of the volume in a third sparse file.

5. The method of claim 1, further comprising:
   exporting the sparse file as a new block device.

6. The method of claim 1, further comprising:
   reducing an amount of space required to store the first and second point-in-time images by compressing the sparse file.

7. The method of claim 1, further comprising:
   replicating the volume by copying the sparse file to a remote location.

8. The method of claim 1, further comprising:
   initiating an operation that will increase the size of the sparse file, wherein
     the initiating causes a file system to allocate additional storage space to the sparse file.

9. The method of claim 1, wherein
   the sparse file includes a plurality of units of data,
   metadata is associated with the sparse file, and
   the metadata identifies which of the units of data are included in each of the first and second point-in-time images.

10. The method of claim 1, further comprising:
    performing a file system operation on the sparse file.

11. The method of claim 1, further comprising:
    using a file-sharing protocol to share access to the first and second point-in-time images.

12. The method of claim 1, further comprising:
    performing at least one of: cataloging, versioning, and archiving of the first and second point-in-time images.

13. A computer readable storage medium comprising program instructions executable to implement a data protection utility, wherein the data protection utility is configured to:
    create a first point-in-time image of a volume in a sparse file, wherein
      the first point-in-time image is represented in a sparse format, and
      creation of the first point-in-time image comprises:
        identifying a first block of data within the volume, wherein the first block of data is identified in response to being modified subsequent to a particular point in time, and
        storing a copy of the first block of data to the sparse file, in response to the identifying the first block of data;
    create a second point-in-time image of the volume in the sparse file, wherein
      the second point-in-time image is represented in the sparse format, and
      creation of the second point-in-time image comprises:
        identifying a second block of data within the volume, wherein
          the second block of data is identified in response to being modified subsequent to the particular point in time, and
        storing a copy of the second block of data to the sparse file, in response to the identifying the second block of data and perform an administrative action on the first and second point-in-time images stored within the sparse file, wherein performance of the administrative action comprises specifying the sparse file as a target of a file-specific command, and the file-specific command is one of a plurality of file system commands.

14. The computer readable storage medium of claim 13, wherein the program instructions are executable to store the first block of data to the sparse file by:

advancing to a new location in the sparse file without writing to one or more intervening locations; and writing a value of the first block of data at the new location in the sparse file.

15. The computer readable storage medium of claim 14, wherein the program instructions are further executable to:

export the sparse file as a new block device.

16. The computer readable storage medium of claim 14, wherein the program instructions are further executable to:

replicate the volume by copying the sparse file to a remote location.

17. The computer readable storage medium of claim 13, wherein the sparse file includes a plurality of units of data, metadata is associated with the sparse file, and the metadata identifies which of the units of data are included in each of the first and second of point-in-time images.

18. A system comprising:

one or more computer readable storage media, wherein the one or more computer readable storage media implement a volume;

means for creating a first point-in-time image of the volume in a sparse file, wherein the first point-in-time image is represented in a sparse format;

means for identifying a first block of data within the volume, wherein the first block of data is identified in response to being modified subsequent to a particular point in time;

means for storing a copy of the first block of data to the sparse file, in response to identification of the first block of data;

means for creating a second point-in-time image of the volume in a sparse file, wherein the second point-in-time image is represented in the sparse format;

means for identifying a second block of data within the volume, wherein the second block of data is identified in response to being modified subsequent to the particular point in time;

means for storing a copy of the second block of data to the sparse file, in response to identification of the second block of data; and means for performing an administrative action on the first and second point-in-time images stored within the sparse file, wherein performing the administrative action comprises specifying the sparse file as a target of a file-specific command, and the file-specific command is one of a plurality of file system commands.

19. The system of claim 18, wherein the storing the copy of the first block of data to the sparse file comprises:

advancing to a new location in the sparse file without writing to one or more intervening locations; and writing a value of the first block of data at the new location in the sparse file.

20. The system of claim 18, wherein the sparse file includes a plurality of units of data, metadata is associated with the sparse file, and the metadata identifies which of the units of data are included in each of the first and second point-in-time images.

21. A system comprising:

a processor; and a memory coupled to the processor, wherein the memory stores program instructions executable by the processor to:

create a first point-in-time image of a volume in a sparse file, wherein the first point-in-time image is represented in a sparse format, and creation of the first point-in-time image comprises:

identifying a first block of data within the volume, wherein the first block of data is identified in response to being modified subsequent to a particular point in time, and storing a copy of the first block of data to the sparse file, in response to the identifying the first block of data;

create a second point-in-time image, of the volume in the sparse file wherein the second point-in-time image is represented in the sparse format, and creation of the second point-in-time image comprises:

identifying a second block of data within the volume, wherein the second block of data is identified in response to being modified subsequent to the particular point in time, and storing a copy of the second block of data to the sparse file, in response to the identifying the second block of data; and performing perform an administrative action on the first and second point-in-time images stored within the sparse file, wherein performance of the administrative action comprises specifying the sparse file as a target of a file-specific command, and the file-specific command is one of a plurality of file system commands.

22. The system of claim 21, wherein the program instructions are executable by the processor to store the first block of data to the sparse file by:

advancing to a new location in the sparse file without writing to one or more intervening locations; and writing a value of the first block of data at the new location in the sparse file.

23. The system of claim 21, wherein the sparse file includes a plurality of units of data, metadata is associated with the sparse file, and the metadata identifies which of the units of data are included in each of the first and second point-in-time images.

* * * * *